US011680200B2

(12) United States Patent
Li et al.

(10) Patent No.: US 11,680,200 B2
(45) Date of Patent: Jun. 20, 2023

(54) GEL FLUID COMPOSITES COMPRISING NANOSILICA AND QUANTUM DOTS FOR SEALING WATER PRODUCTION IN A WELLBORE

(71) Applicant: Saudi Arabian Oil Company, Dhahran (SA)

(72) Inventors: Wengang Li, Dhahran (SA); Jin Huang, Dhahran (SA)

(73) Assignee: Saudi Arabian Oil Company, Dharhan (SA)

( * ) Notice: Subject to any disclaimer, the term of this patent is extended or adjusted under 35 U.S.C. 154(b) by 29 days.

(21) Appl. No.: 17/527,404

(22) Filed: Nov. 16, 2021

(65) Prior Publication Data

US 2023/0151261 A1    May 18, 2023

(51) Int. Cl.
| | |
|---|---|
| *E21B 47/005* | (2012.01) |
| *C09K 8/516* | (2006.01) |
| *C09K 8/565* | (2006.01) |
| *B82Y 15/00* | (2011.01) |
| *B82Y 20/00* | (2011.01) |
| *E21B 33/138* | (2006.01) |
| *C09K 8/504* | (2006.01) |
| *C09K 11/56* | (2006.01) |

(52) U.S. Cl.
CPC .......... *C09K 8/5045* (2013.01); *C09K 8/516* (2013.01); *C09K 11/565* (2013.01); *E21B 33/138* (2013.01); *E21B 47/005* (2020.05); *B82Y 15/00* (2013.01); *B82Y 20/00* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 8,685,903 B2* | 4/2014 | Ravi | C09K 8/473 |
| | | | 106/812 |
| 9,494,023 B2 | 11/2016 | Turkenburg et al. | |
| 10,280,737 B2 | 5/2019 | Gupta et al. | |
| 10,934,835 B2 | 3/2021 | Deville et al. | |
| 10,954,427 B2* | 3/2021 | Kalgaonkar | C09K 8/487 |
| 11,205,741 B2* | 12/2021 | Kurtin | C09K 11/565 |
| 2011/0214488 A1* | 9/2011 | Rose | E21B 47/11 |
| | | | 977/932 |
| 2014/0196894 A1 | 7/2014 | Berkland et al. | |

(Continued)

OTHER PUBLICATIONS

Hu, et al., Silica-Polymer Dual Layer-Encapsulated Quantum Dots with Remarkable Stability, Department of Bioengineering, University of Washington, www.ACSNANO.org, Sep. 23, 2010, pp. 6080-6086, vol. 4, No. 10, American Chemical Society.

(Continued)

*Primary Examiner* — Charles R Nold
(74) *Attorney, Agent, or Firm* — Dinsmore & Shohl LLP

(57) ABSTRACT

According to embodiments disclosed herein, a gel fluid composite may include a nanosilica gel and a plurality of quantum dot tracers. The nanosilica gel may be configured to seal one or more downhole fractures in a wellbore. The plurality of quantum dot tracers may be dispersed in the nanosilica gel. The plurality of quantum dot tracers may each include a semiconductor particle core housed in a silica shell.

20 Claims, 2 Drawing Sheets

(56) References Cited

U.S. PATENT DOCUMENTS

2022/0276217 A1\* 9/2022 Schimmel .............. G01N 33/24

OTHER PUBLICATIONS

Almohsin, et al., Nanosilica Based Fluid System for Water Shut-Off, EOR Maximising the Development of Mature Fields 22nd World Petroleum Congress, 2017, pp. 1-20, Istanbul, Turkey.

Zhou, et al., Greener synthesis and optimization of highly photoluminescence Mn2+-doped ZnS quantum dots, Journal of Luminescence 158 2015, pp. 177-180.

U.S. Notice of Allowance dated Dec. 19, 2022 pertaining to U.S. Appl. No. 17/559,299, filed Dec. 22, 2021, 13 pages.

Kumar et al., "Covalently Dye-Linked, Surface-Controlled, and Bioconjugated Organically Modified Silica Manoparticles as Targeted Probes for Optical Imaging", ACS NANO, vol. 2, No. 3, pp. 449-456, Mar. 7, 2008.

\* cited by examiner

US 11,680,200 B2

GEL FLUID COMPOSITES COMPRISING NANOSILICA AND QUANTUM DOTS FOR SEALING WATER PRODUCTION IN A WELLBORE

BACKGROUND

Field

The present disclosure relates to natural resource well drilling and hydrocarbon production from subterranean formations and, more specifically, to a gel fluid composite for eliminating or reducing water production in a hydrocarbon wellbore.

Technical Background

The discovery and extraction of hydrocarbons, such as oil or natural gas, from subterranean formations may be impeded for a variety of reasons, such as produced water in the reservoir. Specifically, produced water is a significant concern for the oil and gas industry with produced resulting in incurred handling costs and oil recovery costs as well as affecting productivity through scale formation, corrosion of the field equipment and potential formation failure. Before discharge or reinjection, the produced water needs to be treated to meet governmental regulations and prevent environmental pollution. To overcome these issues economically, water production is minimized for water shutoff treatments applied to zones via mechanical isolation or chemical based isolation or by drilling in a manner to avoid produced water.

Accordingly, there is a desire for systems and methods for improved management of produced water during hydrocarbon production.

SUMMARY

According to an embodiment of the present disclosure, a gel fluid composite may comprise a nanosilica gel and a plurality of quantum dot tracers. The nanosilica gel may be configured to seal one or more downhole fractures in a wellbore. The plurality of quantum dot tracers may be dispersed in the nanosilica gel. The plurality of quantum dot tracers may each comprise a semiconductor particle core housed in a silica shell.

According to another embodiment of the present disclosure, the gel fluid composite may be monitored by a method comprising directing a gel fluid composite into a wellbore, irradiating the gel fluid composite with an ultraviolet light, and detecting the one or more tracer photons tracers using a detection device. The wellbore may extend into a subsurface. The wellbore may comprise one or more downhole fractures such that the gel fluid composite enters at least one of the one or more downhole fractures. The gel fluid composite may comprise a nanosilica gel configured to seal the one or more downhole fractures, and a plurality of quantum dot tracers dispersed in the nanosilica gel, wherein the plurality of quantum dot tracers each comprise a semiconductor particle core housed in a silica shell. The ultraviolet light may irradiate at least one of the plurality of quantum dot tracers, thereby exciting an electron such that the at least one of the plurality of quantum dot tracers emits one or more tracer photons.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
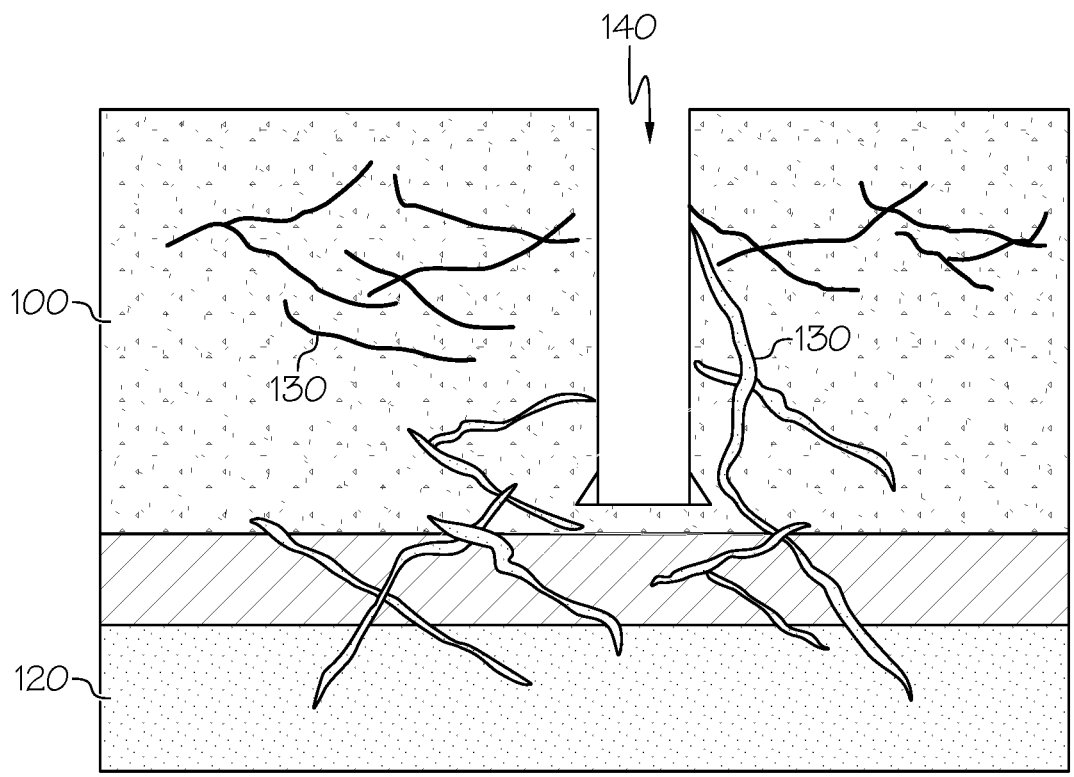
FIG. 1A schematically depicts a subterranean showing fractures connecting a wellbore and a water bearing zone, according to one or more embodiments shown and described herein.

Reference will now be made to a gel fluid composite for use as a water shutoff agent for sealing downhole fractures in a wellbore. The gel fluid composite includes a nanosilica gel and a plurality of quantum dot tracers dispersed in the nanosilica gel. The nanosilica gel includes surface modified nanosilica and an activator and may be used to plug fractures in a wellbore to prevent unwanted water from entering the wellbore. The quantum dot tracers include a core-shell structure comprising a semiconductor particle core, such as ZnS, housed in a silica shell that is compatible with the nanosilica gel. When the quantum dot tracers are irradiated by ultraviolet light, an electron in the quantum dot tracers (i.e., in the semiconductor particle core) is excited to a state of higher energy (e.g., from the valence band to the conductance band) and then drops back to the lower state of energy (e.g., back to the valance band), thereby releasing energy by the emission of light. This emission provides positional information regarding the location of the quantum dot tracers and the nanosilica gel in the subsurface. This positional information can be used to determine if the nanosilica gel is properly positioned in the wellbore and the surrounding subsurface to provide water shut off functionality. Embodiments of a gel fluid composite and methods of sealing downhole fractures in the wellbore using the gel fluid composite will now be described and, whenever possible, the same reference numerals will be used throughout the drawings to refer to the same or like parts.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing. Coiled tubing may also be used as part of the production tubing.

The present disclosure is directed to compositions and methods for shutting off or reducing unwanted production of water within a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to surface.

However, the wellbore may also be in fluid communication with water bearing zones within the subterranean formation. As used in the present disclosure, the term "water bearing zones" may refer to the regions of the subterranean formation having water that occurs naturally within the pores of rock. The fractures within the subterranean formation which allows for hydrocarbons to flow to the wellbore also allows formation water from the water bearing zones to flow to the wellbore.

Embodiments of the present disclosure include methods of forming a barrier to shut off or reduce unwanted production of water in a subterranean formation. The method includes directing (e.g., injecting) a gel fluid composite into one or more water producing fractures in the subterranean formation. In accordance with the present disclosure, the gel fluid composite includes a nanosilica gel comprising silica nanoparticles and an activator. Quantum dot tracers are dispersed in the nanosilica gel, the quantum dot tracers comprise a semiconductor particle core housed in a silica shell that is chemically compatible with the nanosilica gel.

As described herein, the quantum dot tracers may provide positional information regarding placement of the gel fluid composite in the subterranean formation, for example, in the one or more water producing fractures.

Figure 1B:
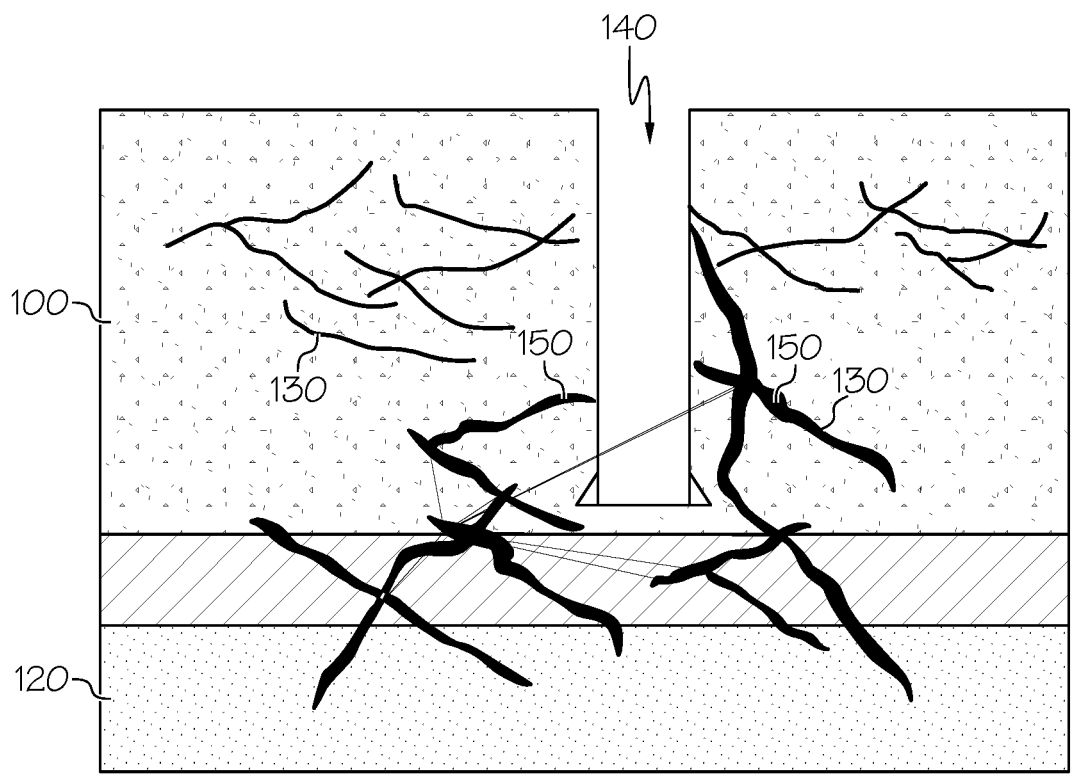
FIG. 1B schematically depicts the subterranean formation of FIG. 1A with the injection of a gel fluid composite, according to one or more embodiments shown and described herein.

With reference to FIGS. 1A and 1B, a production well and associated fractures are illustrated. The subterranean formation includes a hydrocarbon bearing zone 100 and a water bearing zone 120. The hydrocarbon bearing zone 100 is characterized by the region of the subterranean formation which includes recoverable hydrocarbons within the matrix of the subterranean formation. The water bearing zone 120 is characterized by the region of the subterranean formation having water that occurs naturally within the pores of rock. Each of the hydrocarbon bearing zone 100 and the water bearing zone 120 are interlaced with fractures 130 which facilitate flow of hydrocarbons, formation water, or both through the subterranean formation. To recover the hydrocarbons within the subterranean formation, a wellbore 140 is provided within the subterranean formation in fluid communication with the fractures 130.

The water bearing zone 120 of the subterranean formation may be sequestered from the wellbore 140 by introduction of a gel fluid composite 150 into water producing fractures in the subterranean formation. It will be appreciated that the water producing fractures are the fractures 130 which are in fluid communication with the water bearing zone 120 and the wellbore 140 thus are capable of flowing formation water from the water bearing zone 120 to the wellbore 140. FIG. 1A provides an illustration of the subterranean formation prior to treatment in accordance with methods of the present disclosure and FIG. 1B provides an illustration of the water producing fractures obstructed with the gel fluid composite 150.

It will be appreciated that the fractures 130 interlaced throughout the subterranean formation may be naturally occurring or induced with enhanced oil recovery techniques such as fracturing operations. The methods for shutting off or reducing unwanted production of water in the subterranean formation with the gel fluid composite 150 of the present disclosure may be applied to all fractures 130 regardless of whether they are naturally occurring or induced with enhanced oil recovery techniques.

Forming a barrier to shut off or reduce unwanted production of water in a subterranean formation involves directing the gel fluid composite 150 in accordance with the present disclosure into one or more water producing fractures 130 in the subterranean formation. It will be appreciated that the gel fluid composite 150 may be injected into the water producing fractures 130 in accordance with methods and techniques familiar to those skilled in the art for placement of drilling or treatment fluids within the fractures 130 of a subterranean formation. In one or more embodiments, the gel fluid composite 150 may be directed (e.g., injected) into the water producing fractures 130 via coiled tubing or production tubing placed downhole. The polymer-sand nanocomposite may further be directed to the fractures 130 desired for treatment with the placement of bridge plugs or other devices to direct or obstruct flow.

Figure 2:
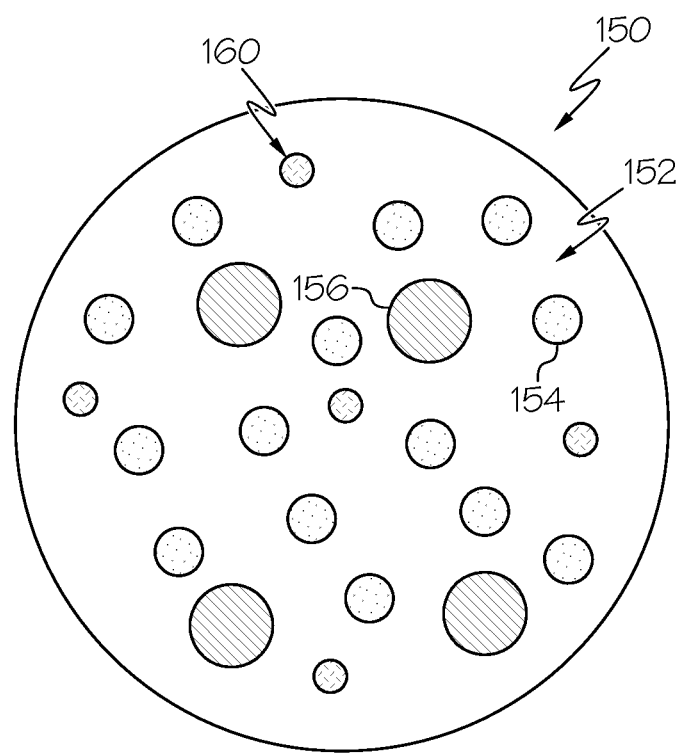
FIG. 2 schematically depicts the gel fluid composite, according to one or more embodiments shown and described herein.

Referring now to FIG. 2, a schematic illustration of the gel fluid composite 150 is depicted. As shown in FIG. 2, the gel fluid composite 150 comprises a nanosilica gel 152 and a plurality of quantum dot tracers 160 dispersed in the nanosilica gel 152. The nanosilica gel 152 is configured to seal the one or more downhole fractures 130 in the wellbore 140 and operates as the water shutoff agent. The plurality of quantum dot tracers 160 are configured to emit one or more tracer photons to provide positional information regarding the placement of the gel fluid composite 150 in the subsurface 100, for example, in the one or more downhole fractures 130.

Referring still to FIG. 2, in some embodiments, the nanosilica gel 152 comprises silica nanoparticles 154 and an activator 156. In some embodiments, the silica nanoparticles 154 comprise amorphous colloidal silica nanoparticles. In some embodiments, the activator 156 comprises sodium silicate or sodium chloride. The silica nanoparticles 154 may comprise a spherical shape (although it should be understood that any shape that silica may take is contemplated. Furthermore, the silica nanoparticles 154 may comprise a maximum cross sectional dimension (e.g., diameter in spherical embodiments) of from 3 nm to 100 nm, such as 5 nm, 8 nm, 10 nm, 12 nm, 15 nm, 20 nm, 25 nm, 30 nm, 35 nm, 50 nm, 75 nm, or any range having any two of these values as endpoints. The silica nanoparticles 154 of the nanosilica gel may collectively comprise an average maximum cross sectional dimension (e.g., diameter in spherical embodiments) of from 8 nm to 20 nm, such as from 10 nm to 15 nm. Furthermore, the silica nanoparticle 154 of the nanosilica gel 152 may comprise a negative surface charge.

Referring still to FIG. 2, in some embodiments, the silica nanoparticles 154 may comprise from 40 wt % to 95 wt % of the nanosilica gel, for example, 45 wt %, 50 wt %, 55 wt %, 60 wt %, 65 wt %, 70 wt %, 75 wt %, 80 wt %, 85 wt %. 90 wt %, or any range having any two of these values as endpoints.

The nanosilica gel 152 of the gel fluid composite 150 is transformable from an aqueous phase to a gel phase. In the aqueous phase, the nanosilica gel 152 comprises an aqueous dispersion of silica nanoparticles having a viscosity of greater than 1 centipoise (cp) to less than 10 cp. That is, in the aqueous phase, the nanosilica gel 152 comprises a greater viscosity than water (i.e., greater than 1 cp) but a low enough viscosity to flow freely into the one or more fractures 130. In the gel phase, the nanosilica gel 152 comprises a viscosity of 10 cp or greater, such as 25 cp or greater, 50 cps or greater, 100 cps or greater, 200 cps or greater, 500 cps or greater, 1000 cps or greater, or the like. Indeed, in the gel phase, the viscosity of the nanosilica gel 152 is high enough to seal the one or more fractures 130 and operate as a water shutoff agent. In operation, the nanosilica gel 152 transforms from the aqueous phase to the gel phase after a gelation period in which the nanosilica gel 152 is subject to a gelation temperature. In some embodiments, the gelation period comprises from 30 minutes to 600 minutes and the gelation temperature is 270° C. or greater.

Figure 3:
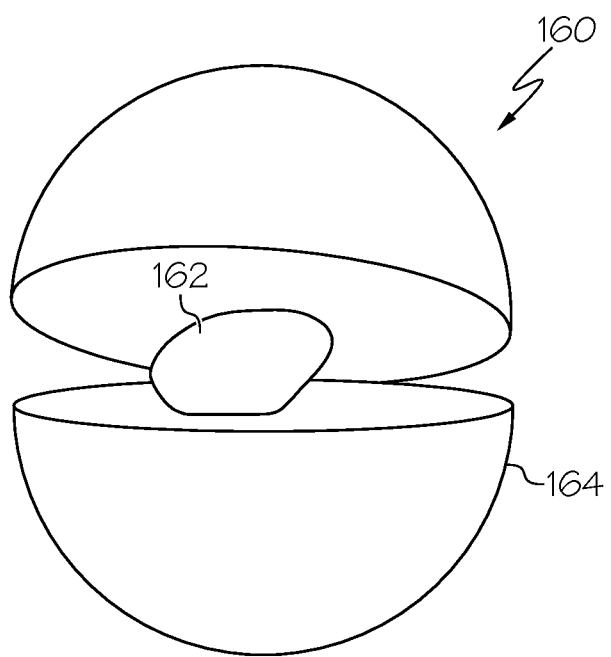
FIG. 3 schematically depicts a quantum dot tracer, according to one or more embodiments shown and described herein.

Referring now to FIGS. 2 and 3, the plurality of quantum dot tracers 160 dispersed in the nanosilica gel 152 to form the gel fluid composite 150 each comprise a semiconductor particle core 162 housed in a silica shell 164. In some embodiments, the semiconductor particle core 162 comprises a metal chalcogenide, such as ZnS, ZnSe, ZnTe, CdSe, CdS, CdTe, CdSeS, PbS, PbSe, and PbTe. Other materials that may form the semiconductor particle core 162 include InAs and InP. In some embodiments, the semiconductor particle core 162 of the plurality of quantum dot tracers 160 comprises a maximum cross-sectional dimension (e.g., diameter) of from 0.5 nm to 20 nm, for example 1 nm, 2 nm, 4 nm, 5 nm, 6 nm, 8 nm, 10 nm, 12 nm, 14 nm, 15 nm, 16 nm, 18 nm, or any range have any two of those values as endpoints. Furthermore, the nanosilica gel 152 is chemically compatible with the silica shell 164 of each of the plurality of quantum dot tracers 160 and thus the gel fluid composite 150 is a chemically stable within the one or more fractures 130 that extend into the wellbore 140.

Referring still to FIGS. 2 and 3, the semiconductor particle core 162 of each of the plurality of quantum dot tracers 160 is configured to emit one or more tracer photons upon absorption of ultraviolet light. Without intending to be limited by theory, when a quantum dot tracer 160 is irradiated by ultraviolet light, the quantum dot tracer 160, in particular, the semiconductor particle core 162, absorbs the ultraviolet light, exciting one or more electrons in the semiconductor particle core 162 from a first energy state to a second energy state. After a period of time, the electron returns from the second energy state back to the first energy state. Upon return of the electron from the second energy state to the first energy state, the semiconductor particle core 162, and thus, the quantum dot tracer 160, emits one or more tracer photons. In operation, one or more tracer photons may be detected using a detection device, which may be positioned above the subsurface.

Referring now to FIGS. 1A-3, methods of forming a barrier to shut off or reduce unwanted production of water in a subterranean formation using the gel fluid composite 150 and monitoring the gel fluid composite 150 will now be described These methods include directing the gel fluid composite 150 into the wellbore 140 such that the gel fluid composite 150 enters at least one of the one or more downhole fractures 130. The gel fluid composite 150 may be directed into the wellbore 110 using a pumping system. In some embodiments, the gel fluid composite 150 is in the aqueous phase when directed into the wellbore. Next, the method includes irradiating the gel fluid composite 150 with an ultraviolet light such that the ultraviolet light irradiates a quantum dot tracer 160 disposed in the gel fluid composite 150, thereby exciting an electron such that the quantum dot tracer 160 emits one or more tracer photons, and detecting the one or more tracer photons using a detection device. The detection device may be positioned in the wellbore 140 or positioned above the subsurface. One example detection device is a florescence detector. The ultraviolet light may be output by an ultraviolet light source, which may positioned in the wellbore or above the subsurface. Next, the method includes determining positional information of the gel fluid composite 150 in the subsurface 100 based the one or more tracer photons detected using the detection device and determining a sealing status of the one or more downhole fractures 130 of the wellbore 140 based on the positional information of the gel fluid composite 150.

Moreover, once the gel fluid composite 150 is directed into the wellbore 110, the gel fluid composite 150 may be irradiated after a gelation period. During the gelation period, the nanosilica gel 152 of the gel fluid composite 150 is subjected to a gelation temperature such that the nanosilica gel 152 transforms from an aqueous phase to a gel phase prior to irradiating the gel fluid composite 150. Waiting to irradiate the gel fluid composite 150 until after the gelation period allows the gel fluid composite 150 to increase in viscosity and seal the fractures 130 before determining the position of the gel fluid composite 150.

Referring again to FIGS. 1A-3, in embodiments in which the semiconductor particle core 162 of the quantum dot tracers 160 comprise ZnS, the ZnS semiconductor particle core 162 is prepared in an aqueous solution. As an illustrative example of the preparation method, first, 96 mL of 0.02 mol/L $Zn(OAc)_2$ solution and 0.3 mL of 3-Mercaptopropionic acid (MPA) may be added a container while stirring, such as a 250 mL three-necked flask, to form a solution mixture. Next, the pH value of the solution mixture is adjusted to 10.5 by adding one or more drops a 1.0 mol/L NaOH solution to the container while stirring. Next, 0.4803 g of $Na_2S \cdot 9H_2O$ is dissolved in 5 mL of deionized water and injected into the solution mixture. The solution mixture is then heated under reflux at 100° C. for 1 hour and then cooled to room temperature. A powder of ZnS quantum dot particles is precipitated by adding a double volume of ethanol. The method may next include a centrifuging step followed by an ethanol washing step to prepare the ZnS quantum dot particles for incorporation into silica spheres, which is done by dispersing ZnS quantum dot particles in chloroform to form the plurality of quantum dot tracers 160.

In some embodiments, the silica shell 164 may be formed around each semiconductor particle core 162 to form the plurality of quantum dot tracers 160 using a reverse microemulsion process. As an illustrative example of such a reverse microemulsion method, 13 ml IGEPAL CO-520 may be added to 100 ml cyclohexane, followed by the addition of 20 nmol of ZnS quantum dot particles in 1 ml of chloroform, 800 μL of tetraethoxysilane (TEOS), and a 1500 μL ammonia aqueous solution (comprising 30% ammonia by weight). Between each chemical addition, the reaction mixture may be stirred for a period of time, such as 15 min. The final mixture solution is then stirred continuously for 24 hours in dark conditions. After the silica condensation reaction, the plurality of quantum dot tracers 160 are isolated from the microemulsion by addition of ethanol (30 ml) followed by centrifugation at 4000 rpm for 10 min. The resulting plurality of quantum dot tracers 160 are then repeatedly rinsed with ethanol and dispersed in deionized water. For example, the quantum dot tracers plurality of quantum dot tracers 160 may be dispersed in deionized water as a 1% dispersant and mixed with the nanosilica gel 152 to form the gel fluid composite 150.

The present disclosure includes one or more non-limiting aspects. A first aspect includes a gel fluid composite comprising a nanosilica gel configured to seal one or more downhole fractures in a wellbore and a plurality of quantum dot tracers dispersed in the nanosilica gel, wherein the plurality of quantum dot tracers each comprise a semiconductor particle core housed in a silica shell.

A second aspect includes any above aspect, wherein the semiconductor particle core of the plurality of quantum dot tracers comprises a maximum cross-sectional dimension of from 0.5 nm to 20 nm.

A third aspect includes any above aspect, wherein the semiconductor particle core of the plurality of quantum dot tracers comprises ZnS.

A fourth aspect includes any above aspect, wherein the semiconductor particle core of each of the plurality of quantum dot tracers is configured to emit one or more tracer photons upon absorption of ultraviolet light.

A fifth aspect includes any above aspect, wherein the nanosilica gel is chemically compatible with the silica shell of each of the plurality of quantum dot tracers.

A sixth aspect includes any above aspect, wherein the nanosilica gel comprises silica nanoparticles and an activator.

A seventh aspect includes any above aspect, wherein the nanosilica gel is transformable from an aqueous phase to a gel phase. In the aqueous phase, the nanosilica gel comprises an aqueous dispersion of silica nanoparticles having a viscosity of greater than 1 cp to less than 10 cp. In the gel phase, the nanosilica gel comprises a viscosity of 10 cp or greater.

An eighth aspect includes any above aspect, wherein the nanosilica gel is configured to transform from the aqueous phase to the gel phase after a gelation period in which the nanosilica gel is subject to a gelation temperature.

A ninth aspect includes any above aspect, wherein the silica nanoparticles comprise from 40 wt % to 95 wt % of the nanosilica gel and the activator comprises sodium silicate or sodium chloride.

A tenth aspect includes any above aspect, wherein the silica nanoparticles comprise a spherical shape and each have a diameter of from 3 nm to 100 nm and the silica nanoparticles have an average diameter of from 10 nm to 15 nm.

An eleventh aspect includes a method of monitoring a gel fluid composite, the method comprising: directing a gel fluid composite into a wellbore extending into a subsurface, the wellbore comprising one or more downhole fractures such that the gel fluid composite enters at least one of the one or more downhole fractures, wherein the gel fluid composite comprises: a nanosilica gel configured to seal the one or more downhole fractures; and a plurality of quantum dot tracers dispersed in the nanosilica gel, wherein the plurality of quantum dot tracers each comprise a semiconductor particle core housed in a silica shell; irradiating the gel fluid composite with an ultraviolet light such that the ultraviolet light irradiates at least one of the plurality of quantum dot tracers, thereby exciting an electron such that the at least one of the plurality of quantum dot tracers emits one or more tracer photons; and detecting the one or more tracer photons using a detection device.

A twelfth aspect includes any above aspect, wherein a gelation period occurs between directing the gel fluid composite into the wellbore and irradiating the gel fluid composite occurs after the gelation period subsequent to directing the gel fluid composite into the wellbore. During the gelation period, the nanosilica gel is subjected to a gelation temperature such that the nanosilica gel transforms from an aqueous phase to a gel phase prior to irradiating the gel fluid composite.

A thirtieth aspect includes any above aspect, wherein in the aqueous phase, the nanosilica gel comprises an aqueous dispersion of silica nanoparticles having a viscosity of greater than 1 cp to less than 10 cp. In the gel phase, the nanosilica gel comprises a viscosity of 10 cp or greater.

A fourteenth aspect includes any above aspect, further comprising determining positional information of the gel fluid composite in the subsurface based on the one or more tracer photons detected using the detection device.

A fifteenth aspect includes any above aspect, further comprising determining a sealing status of the one or more downhole fractures of the wellbore based on the positional information of the gel fluid composite.

A sixteenth aspect includes any above aspect, wherein the semiconductor particle core of the at least one of the plurality of quantum dot tracers absorbs the irradiating ultraviolet light thereby exciting the electron from a first energy state to a second energy state, such that, upon return of the electron from the second energy state to the first energy state, the semiconductor particle core of the at least one of the plurality of quantum dot tracers emits the one or more tracer photons.

A seventeenth aspect includes a gel fluid composite comprising: a nanosilica gel comprising silica nanoparticles and an activator; the silica nanoparticles comprises from 40 wt % to 95 wt % of the nanosilica gel; the activator comprises sodium silicate or sodium chloride; and the nanosilica gel is transformable from an aqueous phase to a gel phase; and in the gel phase, the nanosilica gel comprises a viscosity of 10 cp or greater and is configured to seal one or more downhole fractures in a wellbore; and a plurality of quantum dot tracers dispersed in the nanosilica gel, wherein:

the plurality of quantum dot tracers each comprise a ZnS core housed in a silica shell chemically compatible with the nanosilica gel; and the ZnS core of each of the plurality of quantum dot tracers is configured to emit one or more tracer photons upon absorption of ultraviolet light.

An eighteenth aspect includes any above aspect, wherein, in the aqueous phase, the nanosilica gel comprises an aqueous dispersion of silica nanoparticles having a viscosity of greater than 1 cp to less than 10 cp. In the gel phase, the nanosilica gel comprises a viscosity of 10 cp or greater.

A nineteenth aspect includes any above aspect, wherein the silica nanoparticles comprise a spherical shape and each have a diameter of from 3 nm to 100 nm and the silica nanoparticles have an average diameter of from 10 nm to 15 nm.

A twentieth aspect includes any above aspect, wherein the ZnS core of the plurality of quantum dot tracers comprises a maximum cross sectional diameter of from 0.5 nm to 20 nm.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. A gel fluid composite comprising:
   a nanosilica gel configured to seal one or more downhole fractures in a wellbore; and
   a plurality of quantum dot tracers dispersed in the nanosilica gel, wherein the plurality of quantum dot tracers each comprise a semiconductor particle core housed in a silica shell.

2. The gel fluid composite of claim 1, wherein the semiconductor particle core of the plurality of quantum dot tracers comprises a maximum cross-sectional dimension of from 0.5 nm to 20 nm.

3. The gel fluid composite of claim 1, wherein the semiconductor particle core of the plurality of quantum dot tracers comprises ZnS.

4. The gel fluid composite of claim 1, wherein the semiconductor particle core of each of the plurality of quantum dot tracers is configured to emit one or more tracer photons upon absorption of ultraviolet light.

5. The gel fluid composite of claim 1, wherein the nanosilica gel is chemically compatible with the silica shell of each of the plurality of quantum dot tracers.

6. The gel fluid composite of claim 1, wherein the nanosilica gel comprises silica nanoparticles and an activator.

7. The gel fluid composite of claim 6, wherein:
   the nanosilica gel is transformable from an aqueous phase to a gel phase;
   in the aqueous phase, the nanosilica gel comprises an aqueous dispersion of silica nanoparticles having a viscosity of greater than 1 cp to less than 10 cp; and
   in the gel phase, the nanosilica gel comprises a viscosity of 10 cp or greater.

8. The gel fluid composite of claim 7, wherein the nanosilica gel is configured to transform from the aqueous phase to the gel phase after a gelation period in which the nanosilica gel is subject to a gelation temperature.

9. The gel fluid composite of claim 6, wherein the silica nanoparticles comprise from 40 wt % to 95 wt % of the nanosilica gel and the activator comprises sodium silicate or sodium chloride.

10. The gel fluid composite of claim 6, wherein:
    the silica nanoparticles comprise a spherical shape and each have a diameter of from 3 nm to 100 nm; and
    the silica nanoparticles have an average diameter of from 10 nm to 15 nm.

11. A method of monitoring a gel fluid composite, the method comprising:
    directing a gel fluid composite into a wellbore extending into a subsurface, the wellbore comprising one or more downhole fractures such that the gel fluid composite enters at least one of the one or more downhole fractures, wherein the gel fluid composite comprises:
    a nanosilica gel configured to seal the one or more downhole fractures; and
    a plurality of quantum dot tracers dispersed in the nanosilica gel, wherein the plurality of quantum dot tracers each comprise a semiconductor particle core housed in a silica shell;

irradiating the gel fluid composite with an ultraviolet light such that the ultraviolet light irradiates at least one of the plurality of quantum dot tracers, thereby exciting an electron such that the at least one of the plurality of quantum dot tracers emits one or more tracer photons; and detecting the one or more tracer photons using a detection device.

12. The method of claim 11, wherein:
a gelation period occurs between directing the gel fluid composite into the wellbore and irradiating the gel fluid composite occurs after the gelation period subsequent to directing the gel fluid composite into the wellbore;
during the gelation period, the nanosilica gel is subjected to a gelation temperature such that the nanosilica gel transforms from an aqueous phase to a gel phase prior to irradiating the gel fluid composite.

13. The method of claim 12, wherein:
in the aqueous phase, the nanosilica gel comprises an aqueous dispersion of silica nanoparticles having a viscosity of greater than 1 cp to less than 10 cp; and
in the gel phase, the nanosilica gel comprises a viscosity of 10 cp or greater.

14. The method of claim 11, further comprising determining positional information of the gel fluid composite in the subsurface based the one or more tracer photons detected using the detection device.

15. The method of claim 14, further comprising determining a sealing status of the one or more downhole fractures of the wellbore based on the positional information of the gel fluid composite.

16. The method of claim 11, wherein the semiconductor particle core of the at least one of the plurality of quantum dot tracers absorbs the irradiating ultraviolet light thereby exciting the electron from a first energy state to a second energy state, such that, upon return of the electron from the second energy state to the first energy state, the semiconductor particle core of the at least one of the plurality of quantum dot tracers emits the one or more tracer photons.

17. A gel fluid composite comprising:
a nanosilica gel comprising silica nanoparticles and an activator;
the silica nanoparticles comprises from 40 wt % to 95 wt % of the nanosilica gel;
the activator comprises sodium silicate or sodium chloride; and
the nanosilica gel is transformable from an aqueous phase to a gel phase; and
in the gel phase, the nanosilica gel comprises a viscosity of 10 cp or greater and is configured to seal one or more downhole fractures in a wellbore; and
a plurality of quantum dot tracers dispersed in the nanosilica gel, wherein:
the plurality of quantum dot tracers each comprise a ZnS core housed in a silica shell chemically compatible with the nanosilica gel; and
the ZnS core of each of the plurality of quantum dot tracers is configured to emit one or more tracer photons upon absorption of ultraviolet light.

18. The gel fluid composite of claim 17, wherein:
in the aqueous phase, the nanosilica gel comprises an aqueous dispersion of silica nanoparticles having a viscosity of greater than 1 cp to less than 10 cp; and
in the gel phase, the nanosilica gel comprises a viscosity of 10 cp or greater.

19. The gel fluid composite of claim 17, wherein:
the silica nanoparticles comprise a spherical shape and each have a diameter of from 3 nm to 100 nm; and
the silica nanoparticles have an average diameter of from 10 nm to 15 nm.

20. The gel fluid composite of claim 17, wherein the ZnS core of the plurality of quantum dot tracers comprises a maximum cross sectional diameter of from 0.5 nm to 20 nm.

* * * * *